Patented Aug. 5, 1952

2,606,172

UNITED STATES PATENT OFFICE 2,606,172

ACETONE-SOLUBLE, UNSATURATED INTERPOLYMERS OF A DI-2-ALKENYL MALEATE, A STYRENE, AND A 2-ALKENYL ALCOHOL

Pliny O. Tawney, Passaic, N. J., assignor to United States Rubber Company, New York, N. Y., a corporation of New Jersey No Drawing. Application May 21, 1948, Serial No. 28,527

6 Claims. (Cl. 260—78.5)

My invention relates to a new class of soluble, unsaturated ternary interpolymers of a di-2-alkenyl maleate, styrene or a substituted styrene as hereinafter defined, and a 2-alkenyl alcohol. These resins are capable of undergoing further polymerization of copolymerization, particularly in the presence of heat and/or catalyst to form insoluble and substantially infusible products.

The copolymers of styrene with 2-alkenyl esters of polycarboxylic esters, e. g., di-2-alkenyl maleate, are of great potential interest to the plastics industry by reason of their outstanding properties including solvent resistance, thermal stability and optical clarity. However, the preparation of such polymeric materials is attended by early insolubilization of the reaction mixture. This heterogeneous mixture of insoluble gel, low molecular weight polymers and copolymers and unreacted starting materials is difficult to manipulate in subsequent processing operations and is of very limited use in various commercial applications, particularly in coating, impregnating, laminating and molding operations. For such processes a uniformly soluble, fusible resin is desired which, after processing such as molding or spreading, is capable of being converted or "cured" to a solvent- and heat-resistant state.

In order to adapt the copolymers of styrene and a di-2-alkenyl maleate more widely to such uses, the art has halted the copolymerization before insolubilization, or gelation, of the reaction mixture occurs. In this case, however, only minor amount of the monomeric starting materials are converted to the soluble copolymeric form prior to gelation. Hence the copolymer itself must be isolated and purified to free it from the large amounts of unreacted starting materials and the latter in turn must be purified and recycled for use in subsequent copolymerizations. The prior art has suggested that the economic disadvantages of the latter process can be, to some extent, overcome by employing a number of devices to increase the amount of monomeric starting materials which are converted to the soluble polymeric form prior to gelation. However, the various methods suggested, such as the use of large amounts of catalysts, solvents, and/or inhibitors as well as high reaction temperatures, actually effect only disproportionately small improvements in the yield of soluble copolymers and necessitate more extensive purification to remove solvents, catalyst fragments and inhibitors in order that the desirable properties of the resulting resin be retained.

I have now discovered that the amount of styrene and di-2-alkenyl maleate convertible to a soluble polymeric resin can be very markedly increased by interpolymerization thereof with a 2-alkenyl alcohol. In contrast to the prior art my method is effective at moderate reaction temperatures and requires none of the special precautions or devices, e. g., presence of inhibitors, heretofore employed by the art in attempts to delay or avert premature gelation. Moreover, since my method yields more uniform and homogeneous reaction products, elaborate and expensive purification procedures are unnecessary.

The reaction of my invention is carried out by heating, at temperatures such as 25–120° C., a mixture of a di-2-alkenyl maleate with from 0.1 to 5.0 molar equivalents of styrene or a substituted styrene as hereafter defined and with from 0.3 to 7.0 molar equivalents of a 2-alkenyl alcohol for times sufficient to effect an adequate degree of reaction, e. g., 10–200 hours, and usually from 10–120 hours.

The reaction is promoted by a source of free radicals such as peroxidic compounds among which are the organic peroxides, e. g., acetyl peroxide, benzoyl peroxide and tertiary-butyl hydroperoxide. These promoters are employed in amounts of from 0.1 to 20% and preferably 1.0–15% by weight of the reactant mixture. Any organic peroxide capable of catalyzing polymerization of unsaturated organic compounds may be used in the practice of my invention.

The di-2-alkenyl maleates which are operable in my invention include the maleic acid esters of 2-alkenyl alcohols having the structural formula $(R)CH=C(R')—CH_2OH$ where $R$ is selected from the group consisting of hydrogen, chloromethyl, lower alkyl and phenyl and where $R'$ is selected from the group consisting of hydrogen, chlorine, chloromethyl, hydroxymethyl and lower alkyl, such as allyl, 2-methallyl, 2-ethallyl, 2-chloroallyl, 2-(hydroxymethyl)allyl, 2-(chloromethyl)allyl, tiglyl, crotyl, 4-chlorocrotyl and cinnamyl alcohols. Maleic acid esters of the 2-alkenyl alcohols containing a terminal methylene group (i. e., where $R$ in the foregoing formula is hydrogen, $R'$ being as just stated) are preferred, maleic acid esters of allyl and methallyl alcohols being particularly preferred.

I prefer to use styrene in the practice of my invention. However I may replace the styrene in whole or in part by alpha-methyl styrene or a styrene which is nuclearly substituted with lower alkyl, lower alkoxy, halogen or lower haloalkyl, examples being p-methylstyrene, p-methoxystyrene, p-chlorostyrene, o,p-diclorostyrene, p-trichloromethylstyrene, p-fluorostyrene and p-trifluoromethylstyrene.

Suitable 2-alkenyl alcohols for use in my invention include the 2-alkenyl alcohols having the structural formula $(R)CH=C(R')-CH_2OH$ where R is selected from the group consisting of hydrogen, chloromethyl, lower alkyl and phenyl and where R' is selected from the group consisting of hydrogen, chlorine, chloromethyl, hydroxymethyl and lower alkyl, such as allyl, 2-methallyl, 2-ethallyl, 2-chloroallyl, 2-(hydroxymethyl)allyl, 2-(chloromethyl)allyl, tiglyl, crotyl, 4-chlorocrotyl and cinnamyl alcohols. Those 2-alkenyl alcohols which contain a terminal methylene group (i. e. where R in the foregoing formula is hydrogen, R' being as just stated) are preferred, allyl and methallyl alcohols being particularly preferred.

These new ternary interpolymers are supplementary to the binary interpolymers of a di-2-alkenyl maleate and a 2-alkenyl alcohol, disclosed in my copending application Serial No. 646,217, filed February 7, 1946, now Patent No. 2,546,798, in that they provide a softer and somewhat more flexible class of resins of a higher degree of compatibility with hydrocarbon solvents, which are of particular value in the field of protective coatings.

The course of my interpolymerization reaction can be followed by observing the increase in the viscosity of the reaction mixture and the resulting interpolymer can be isolated by precipitation through addition of a non-solvent, e. g., n-hexane, or by removal of any unreacted starting materials by extraction or distillation. Further purification of my ternary interpolymers is generally unnecessary but where desired, e. g., for analytical purposes or optical applications, further pruification can be effected by repeated solution of the interpolymer in a minimum volume of a solvent such as acetone and reprecipitation by the addition of a non-solvent.

My new interpolymers are suitable for a variety of commercial uses, particularly in the field of surface coatings. In the preparation of suitable coating compositions, my interpolymers may be dissolved in appropriate solvents or the crude interpolymerization reaction mixtures may themselves be employed by adding a suitable higher-boiling diluent and subsequently distilling off any unreacted 2-alkenyl alcohol. Moreover my interpolymers can be dissolved in liquid, ethylenically unsaturated, copolymerizable compounds, e. g., tolyl acrylate, benzyl acrylate, vinyl butyrate and diallyl fumarate, to form solutions which can be totally polymerized, leaving no solvent to be evaporated. This latter type solution is particularly useful in molding applications where an initially fluid resin is desired which can be further polymerized with a minimum of shrinking. My interpolymers can likewise be employed in the solid form as thermosetting molding powders for the preparation of various industrial articles including rods, blocks and sheets.

Various inert addends including dyes, pigments, fillers and plasticizers can be incorporated with my interpolymers, preferably at the soluble, fusible stage prior to final cure.

Application of heat to compositions containing my new interpolymers, particularly in the presence of polymerization catalysts such as peroxides, induces further polymerization therein whereby such compositions are converted to a solvent and heat-resistant state.

The following examples disclose my invention in more detail. All parts are by weight.

EXAMPLE 1

Mixtures of diallyl maleate, styrene and allyl alcohol are heated in the presence of benzoyl peroxide until in each case the point of incipient gelation is attained or until no further increase in the viscosity of the reaction mixture is noticeable. The reaction mixtures are then diluted with an excess of n-hexane and the precipitated interpolymers are further purified by repeated solution in a minimum volume of acetone and reprecipitation by the addition of n-hexane, after which they are dried in vacuo to constant weight.

In Table I below are summarized the amounts of the monomeric starting materials, peroxide catalysts and interpolymeric products, together with the reaction times. Table I also includes (I-a) an example of a prior art copolymerization of diallyl maleate and styrene in the absence of a 2-alkenyl alcohol, to emphasize the advantage of my invention.

*Table I*

|   | Diallyl Maleate | Styrene | Allyl Alcohol | Peroxide | Reaction time (hours) | Interpolymeric product |
|---|---|---|---|---|---|---|
| a | 100 | 53.0 |      | 2.45 | 15.75 | 53.0 |
| b | 100 | 53.0 | 14.8 | 3.03 | 22.5  | 61.7 |
| c | 100 | 53.0 | 39.5 | 4.10 | 36.75 | 80.0 |
| d | 100 | 53.0 | 89.0 | 6.13 | ¹71.50 | 103.5 |

¹ No evidence of incipient gelatin.

Comparison of I-a with I-b above shows the marked effect of interpolymerizing even a very small amount of a 2-alkenyl alcohol with a mixture of styrene and a di-2-alkenyl maleate according to my invention. Succeeding examples illustrate the increasing conversions of the di-2-alkenyl maleate and the styrene to the soluble polymeric form in the presence of increasing amounts of a copolymerizable 2-alkenyl alcohol.

EXAMPLE 2

(a) A mixture of 31.2 parts of styrene, 58.8 parts of diallyl maleate, 210 parts of allyl alcohol and 2.04 parts of benzoyl peroxide is heated at reflux (ca. 99° C.) for 24 hours. One and five tenth parts of tert.-butyl hydroperoxide are then added and refluxing is resumed and continued for 45 hours. The interpolymer is isolated and purified as in Example 1 to yield 59.5 parts of polymeric solid.

Analysis: Found, 75.75 C; 7.75% H; iodine number (Wijs), 76.2.

(b) Ten parts of the interpolymer of Example 2(a) are dissolved into 6 parts of methyl acrylate together with 0.15 part of benzoyl peroxide. The solution is poured into a mold and cured by heating for 16 hours at 60° C. The resulting casting is hard, clear and insoluble in acetone.

(c) Two parts of the interpolymer are dissolved in the mixture of 5.16 parts of xylene and 1.0 part of n-butanol. The solution is poured onto a glass plate and heated at 200° C. for 20 minutes. The resulting film is clear, colorless, mar-resistant and insoluble in acetone.

Having thus described my invention, what I claim and desire to protect by Letters Patent is:

1. An acetone-soluble, fusible, unsaturated ternary interpolymer of monomers consisting solely of a monomeric ester selected from the group consisting of diallyl and dimethallyl maleates, monomeric styrene, and a monomeric alcohol selected from the group consisting of allyl and methallyl alcohols, the amount of said styrene being equal to from 0.1 to 5 mols thereof per mol of said ester and the amount of said alcohol being equal to from 0.3 to 7 mols per mol of said ester, said interpolymer being capable of undergoing further polymerization to insoluble, heat-resistant form upon heating in the presence of a peroxidic polymerization catalyst.

2. An acetone-soluble, fusible, unsaturated interpolymer of monomers consisting solely of monomeric diallyl maleate, monomeric styrene and monomeric allyl alcohol, the amount of said styrene being equal to from 0.1 to 5 mols thereof per mol of said diallyl maleate and the amount of said allyl alcohol being equal to from 0.3 to 7 mols thereof per mol of said diallyl maleate, said interpolymer being capable of undergoing further polymerization to insoluble, heat-resistant form upon heating in the presence of a peroxidic polymerization catalyst.

3. An acetone-soluble, fusible, unsaturated, interpolymer of monomers consisting solely of 100 parts of monomeric diallyl maleate, 53 parts of monomeric styrene and 89 parts of monomeric allyl alcohol, said interpolymer being capable of undergoing further polymerization to insoluble, heat-resistant form upon heating in the presence of a peroxidic polymerization catalyst.

4. The process of making an acetone-soluble, fusible, unsaturated ternary interpolymer which comprises heating a mixture of monomers consisting solely of a monomeric ester selected from the group consisting of diallyl and dimethallyl maleates, monomeric styrene, and a monomeric alcohol selected from the group consisting of allyl and methallyl alcohols, the amount of said styrene being equal to from 0.1 to 5 mols thereof per mol of said ester and the amount of said alcohol being equal to from 0.3 to 7 mols thereof per mol of said ester, at a temperature of from 25° to 120° C. in the presence of a peroxidic polymerization catalyst, and thereby effecting conversion of a substantially greater amount of said ester and said styrene to soluble polymeric form than would be so converted in the absence of said alcohol.

5. The process of making an acetone-soluble, fusible, unsaturated interpolymer which comprises heating a mixture of monomers consisting solely of monomeric diallyl maleate, monomeric styrene and monomeric allyl alcohol, the amount of said styrene being equal to from 0.1 to 5 mols thereof per mol of said diallyl maleate and the amount of said allyl alcohol being equal to from 0.3 to 7 mols thereof per mol of said diallyl maleate, at a temperature of from 25° to 120° C. in the presence of an organic peroxide polymerization catalyst and thereby effecting conversion of a substantially greater amount of said diallyl maleate and said styrene to soluble, polymeric form than would be so converted in the absence of said allyl alcohol.

6. The process of making an acetone-soluble, fusible, unsaturated interpolymer which comprises heating a mixture of monomers consisting solely of 100 parts of monomeric diallyl maleate, 53 parts of monomeric styrene and 89 parts of monomeric allyl alcohol, at a temperature of from 25 to 120° C. in the presence of an organic peroxide polymerization catalyst and thereby effecting conversion of a substantially greater amount of said diallyl maleate and said styrene to soluble, polymeric form than would be so converted in the absence of said allyl alcohol.

PLINY O. TAWNEY.

REFERENCES CITED

The following references are of record in the file of this patent:

UNITED STATES PATENTS

| Number | Name | Date |
|---|---|---|
| 2,221,663 | Rothrock | Nov. 12, 1940 |
| 2,378,195 | D'Alelio | June 12, 1945 |
| 2,441,515 | Snyder | May 11, 1948 |
| 2,461,735 | Heilberger | Feb. 15, 1949 |
| 2,526,434 | Tawney | Oct. 17, 1950 |